Sept. 29, 1942.  C. G. BROSTROM  2,296,836
ROUGHING MACHINE
Filed Aug. 22, 1940  4 Sheets-Sheet 1

INVENTOR
Charles G. Brostrom
By his attorney

Sept. 29, 1942.   C. G. BROSTROM   2,296,836
ROUGHING MACHINE
Filed Aug. 22, 1940   4 Sheets-Sheet 3

INVENTOR
Charles G. Brostrom

Sept. 29, 1942.   C. G. BROSTROM   2,296,836
ROUGHING MACHINE
Filed Aug. 22, 1940   4 Sheets-Sheet 4

INVENTOR
Charles G. Brostrom
By his attorney
Merritt Colley

Patented Sept. 29, 1942

2,296,836

UNITED STATES PATENT OFFICE 2,296,836

ROUGHING MACHINE

Charles G. Brostrom, Salem, Mass., assignor to United Shoe Machinery Corporation, Flemington, N. J., a corporation of New Jersey Application August 22, 1940, Serial No. 353,708

12 Claims. (Cl. 69—1)

This invention relates to roughing machines and is herein described as embodied in a machine for roughing the margins of outsoles to prepare them for cement attachment to shoes.

It is the object of the invention to provide an outsole roughing machine which will operate with speed and precision upon soles of all sizes, shapes, thicknesses and marginal bevels, and will produce a uniform, evenly roughened surface upon leathers of all qualities and degrees of hardness.

With this object in view, I have provided a universally adaptable sole feeding mechanism which adjusts itself to the thickness of the work presented to it and feeds the work continuously while maintaining its periphery in contact with a pair of edge gages which are spaced a short distance apart, means being provided to adjust the force with which the work piece is pressed against the edge gages, as may be necessary in handling leather which is hard or soft, thick or thin, and to present the work piece properly to the roughing tool regardless of whether or not the margin of the work is beveled.

In order to operate successfully and accurately upon hard as well as soft leather, I employ a rigid roughing tool which is provided with a large number of sharp teeth and is driven at high speed. This tool is preferably substantially cylindrical, and is rotated about a horizontal axis, the tool shaft being mounted for rotation in a bearing member which is yieldingly urged in the direction of the work by a spring, or the like, so that the tool is drawn into engagement with the work with the proper amount of pressure but can yield to accommodate different thicknesses of material. The axis of the tool is disposed transversely to the direction of feed of the work, with the result that a definite stripe or band having a width equal to the length of the roughing tool is produced upon the sole margin. This roughened stripe or band may extend to the edge of the sole or may be spaced inward from the edge, depending upon the relation between the tool and the edge gages.

The foregoing and other features of the invention will now be described in detail as embodied in an illustrative machine shown in the accompanying drawings, in which Fig. 1 is a view of the machine in front elevation;

Figure 2:
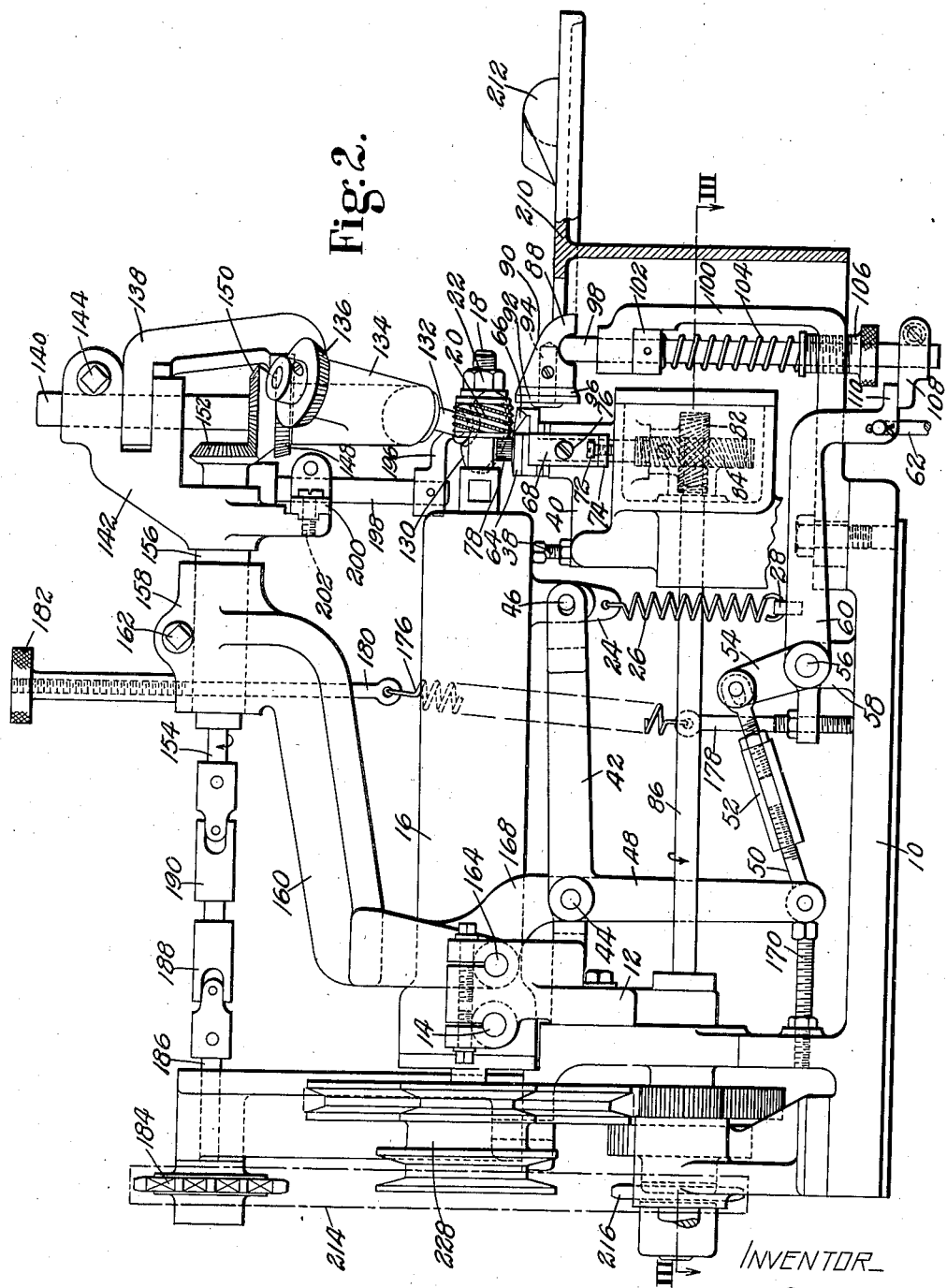
Fig. 2 is a view in side elevation showing the principal mechanisms.

In the drawings, 10 indicates the frame of the machine, which may rest upon a bench or a standard. Secured to the frame 10 is a bracket 12 in which are mounted a pair of pivots 14 (see Fig. 2) supporting the rear portion of a long bearing member 16 in which is journaled the tool shaft 18. A cylindrical roughing tool 20, the circumference of which is provided with a large number of sharp teeth, is secured on the shaft 18 by a nut 22, and such tools of different lengths may be readily interchanged to provide for roughing bands of different widths upon a sole. The pivotal mounting of the member 16 near its rear end permits the tool to yield upward as required by the thickness of the material being operated upon.

Figure 1:
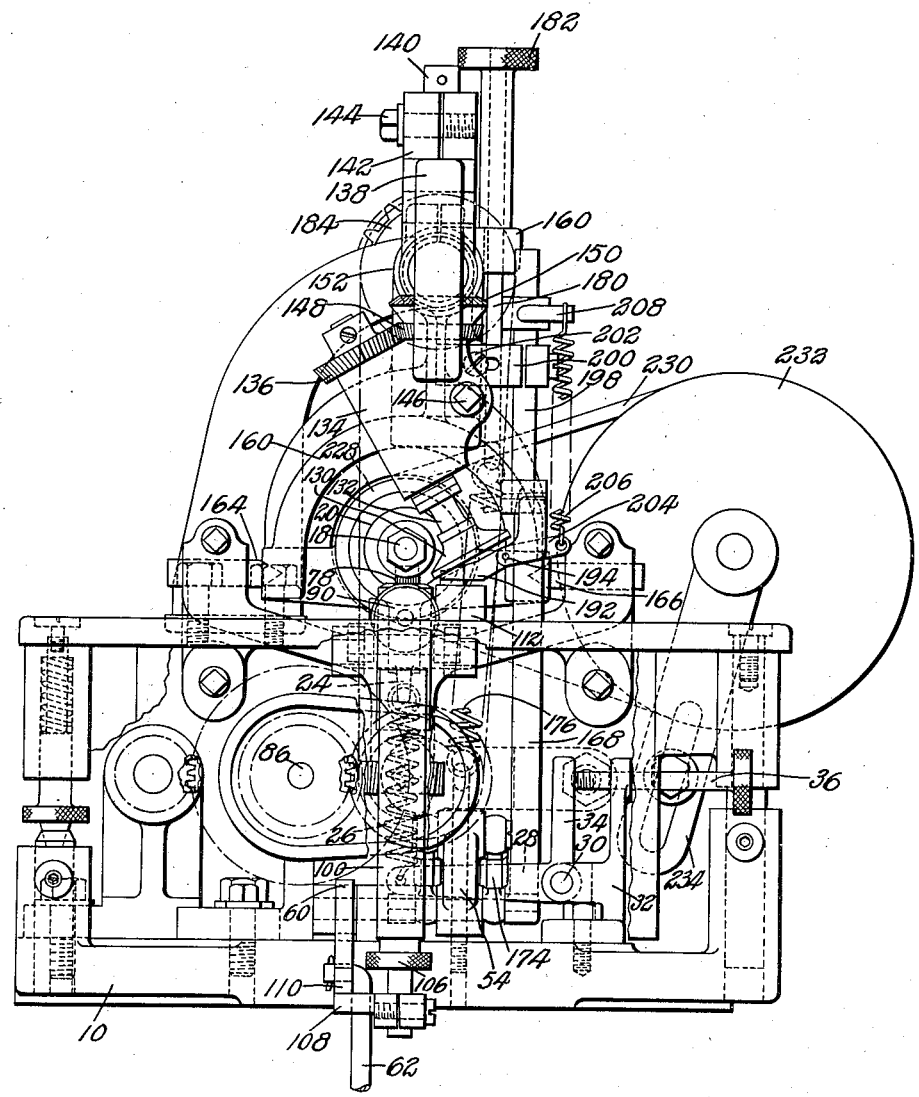

A lug 24 extending downward from the bearing member 16 is connected by a spring 26 to a horizontal arm 28 (Fig. 2) of a bell crank lever which is pivoted at 30 (Fig. 1) in a stationary bracket 32 secured to the base of the frame 10. An upright arm 34 of the bell crank lever engages the end of a thumb screw 36 which is threaded through the bracket 32 and may be used to adjust the tension of the spring 26, which yieldingly urges the tool 20 toward the work. A stop screw 38 threaded into a stationary gear box 40 serves to limit adjustably the extent to which the tool shaft bearing member 16 can be depressed, and thus the tool may be prevented from engaging the sole support immediately beneath it.

In order to raise the bearing member 16 against the tension of the spring 26, a horizontal arm 42 of a bell crank lever, movable about a stationary pivot 44 in the bracket 12, is connected to the lug 24 by a pivot 46; and a depending arm 48 of this bell crank lever is connected by a link 50, including a turn-buckle 52, to a rocker arm 54 secured to a shaft 56 which is journaled in a stationary block 58 upon the base of the frame 10. Also secured to the shaft 56 is an arm 60 connected by a treadle rod 62 to a treadle (not shown). Through the described train of connections, depression of the treadle rod 62 will cause the tool 20 to be lifted when it is desired to insert a work piece in the machine.

Directly beneath the tool the marginal portion of the sole is supported by a horizontal rotary disk 64, part of the circumference of which is embraced by a stationary block 66 having a depending shank 68. A tongue and groove connection 70 (Fig. 4) between the shank 68 and the upper portion of the gear box 40 permits vertical adjustment of the block 66 by means of a screw 72 threaded through a lug 74 projecting laterally from the shank 68, and a screw 76 serves to secure the block in adjusted position.

The disk 64 is provided with a central, upwardly extending, corrugated or roughened circular stud 78 which constitutes one of the two edge gages and also aids in the work-feeding operation by reason of the engagement of the corrugated, rotating stud with the edge of the sole.

The disk 64 is secured to the upper end of a vertical shaft 80 journaled in the gear box 40 and having affixed to its lower end a skew gear 82 which meshes with a similar skew gear 84 secured on the forward end of a horizontal, driven shaft 86.

The sole is additionally supported by a yieldingly mounted block 88, having a sloping upper face 99, which is positioned in front of the tool 20. A disk 92 mounted to rotate freely upon a stud 94 secured in the block 88 engages the under face of the sole and, while permitting the sole to be advanced without appreciable friction, supports a portion of the sole which is not directly beneath the roughing tool. One or more spacing washers 96 interposed between the disk 92 and the block 88 allow the disk to be positioned in proper relation to roughing tools of different lengths.

The block 88 has a depending stem 98 which is guided for vertical movement in a guide 100 secured to the base of the frame 10. A collar 102 secured to the stem 98 limits the upward movement of the latter. The stem 98 is surrounded by a compression spring 104, the upper end of which bears against the collar 102 and the lower end of which bears upon an adjustable bushing 106 threaded through the guide member 100 and serving to regulate the tension of the spring. To the lower end of the stem 98 is adjustably secured a dog 108 in a position to be engaged by the tip 110 of the treadle actuated arm 60 so that when the treadle rod 62 is lowered, the supporting block 88 will be lowered, against the tension of the spring 104.

At one side of the operating position, the sole is supported by a stationary feed plate 112 having an upwardly projecting pin 114 which constitutes the second edge gage. The plate 112 is secured to a block 116 (Figs. 4 and 5) which is in turn mounted upon a base member 118 in relation to which the block can be adjusted transversely of the plate 112 by means of an adjusting screw 120, a clamping screw 122, passing through a slot 123 in the block 116, being provided to lock the parts in adjusted relation.

The base member 118 is secured to a portion 124 of the machine frame 10 by a screw 126 which passes through a slot 128 in the said member and permits the entire assembly of base member 118, block 116 and feed plate 112 to be adjusted in a direction at right angles to that of the adjustment effected by the screw 120.

Cooperating with the feed plate 112 to effect and control the feeding of the sole to the roughing tool, is a feed disk 130 which is affixed to the lower end of an inclined spindle 132 journaled for rotation in a bearing support 134 and having near its upper end a bevel gear 136 through which the spindle and feed disk are driven.

The bearing member 134 has an upwardly projecting portion 138 through which passes an upright stationary shaft 140 held in a split portion of a yoke 142 by a clamping screw 144. The middle portion of the bearing member 134 is also split and is clamped upon the lower end of the shaft 140 by a clamping screw 146. As a result of this arrangement, angular shifting of the bearing member 134, 138 about the vertical axis of the shaft 140 is permitted by loosening either of the clamping screws 144, 146, and it and the feed member carried thereby can then be secured in adjusted position by tightening the screw. The purpose of this adjustment is to change the direction in which the feeding force applied by the feed disk 130 is exerted upon the work.

Loosely surrounding the shaft 140 is a pinion 148 which meshes with the gear 136 and which is integral with a bevel pinion 150 meshing with a bevel gear 152 secured to a shaft 154 journaled for rotation in a sleeve 156 rigid with the yoke 142. The sleeve 156 is clamped in a split portion 158 of an arm 160 by means of a clamping screw 162. The arm 160 is mounted to swing in a vertical plane about fixed pivots 164, 166 which are clamped in the bracket member 12; and extending downward from the arm 160, and rigid therewith, is a lever 168 the rear face of the lower end portion of which engages the head of an adjustable stop screw 170 threaded into the frame 10. The lower end of the said lever is also connected by a link 172, including a turn-buckle 174, to the rocker arm 54, with the result that when the treadle rod 62 is depressed, the arm 160 and the feed disk and operating mechanism carried by the arm are raised. A spring 176 having its lower end connected to a stationary anchoring pin 178 and its upper end connected to a screw 180 passing through a portion of the arm 160 and surrounded by an adjustable thumb nut 182 tends at all times to lower the arm 160 and, consequently, the feed disk 130.

The shaft 154 is driven from a sprocket 184 mounted upon a shaft 186 and connected to the shaft 154 through universal joints 188 and 190.

In order to aid in holding the extreme marginal portion of the sole flat upon the feed plate and to prevent the sole edge from being rolled up by pressure of the sole against the edge gages, I provide a presser foot 192 which extends beneath the inclined feed disk 130 at a point as close as possible to that at which the disk engages the upper face of the sole and is pivoted at 194 to a bracket 196 which extends forward from a vertical bar 198 clamped in a transversely adjustable block 200 secured by a screw 202 to the yoke 142. The tail portion 204 of the presser foot member 192 is connected by a pull spring 206 to an anchoring pin 208 secured to the upper part of the bar 198. The tension of the spring 206 is such as to cause the presser foot 192 to exert sufficient pressure upon the marginal portion of a sole passing beneath it to aid very materially in keeping the said marginal portion flat, a function which is particularly valuable when operating along the shank portion of a sole the edge of which is frequently reduced to such thinness that it is easily rolled up when the edge of the sole is pressed forcibly against the edge gages.

When a sole is inserted between the feed plate 112 and the feed disk 130 with the sole edge against the edge gage 114, rotation of the disk will cause the marginal portion of the sole to be advanced over the plate 112, the disk 64 and the block 66 beneath the roughing tool 20. The bearing member 134 is so adjusted angularly about the axis of the shaft 140 as to cause the feed disk 130 to have considerable so-called "cross feed" effect upon the sole, that is to say, the feed disk exerts force upon the sole in a direction which may be resolved into two components, one of which is in the direction of feed along past the two edge gages, and the other of which is in a direction tending to force the sole edge against the gages. This mechanism operates to feed the sole automatically without any necessity for manual aid or guidance by the operator.

When the sole is engaged by the roughing tool 20, the latter, which is running at very high speed, has a tendency to seize the sole and throw it quickly out of the machine. Under these circumstances, the feed disk 130, which is positively driven at a relatively low speed, has a retarding rather than advancing effect on the sole, and holds the speed of the latter down to the normal rate of feed while the tool 20 is performing the roughing operation.

Figure 4:
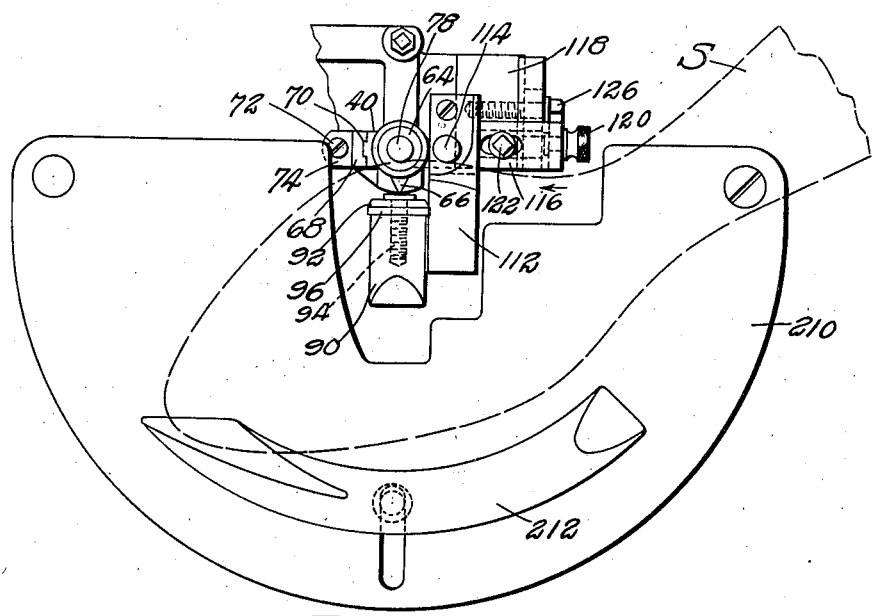
Fig. 4 is a plan view of the sole supporting and guiding parts.
Figure 5:
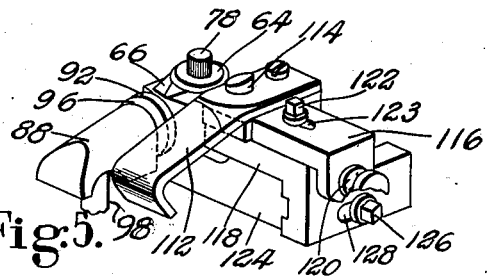
Fig. 5 is an angular view showing the edge gages and sole supporting elements at the operating position.

In order to aid in supporting the sole in proper relation to the roughing tool, I have provided a table 210 which is sufficiently below the level of the disk 64 and the block 66 to permit the sole to tilt to the extent required by the greatest amount of bevel on the sole margin, which is along the shank portion of the sole. An adjustable, arcuate, auxiliary supporting block 212 is provided on top of the table 210 and is set at such a distance from the edge gages that the sole will ride upon it and be supported in a nearly horizontal position when the roughing tool is operating around the forepart of the sole, where there is little or no bevel, but will drop off when the steeply beveled shank portion of the sole reaches operating position. In Fig. 4, a sole S is shown in broken lines in the position relative to the auxiliary support 212 which it assumes as the shank portion of the sole approaches the roughing tool.

Figure 6:
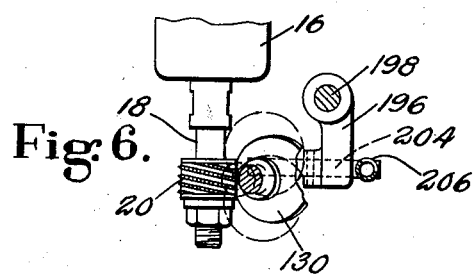
Fig. 6 is a plan view illustrating diagrammatically the effect of various adjustments of the work feeding mechanism.

In Fig. 6, the position of the feed disk 130 relative to the roughing tool 20 is indicated in three different angular adjustments of the bearing member 134 about the axis of the vertical shaft 140.

Figure 3:
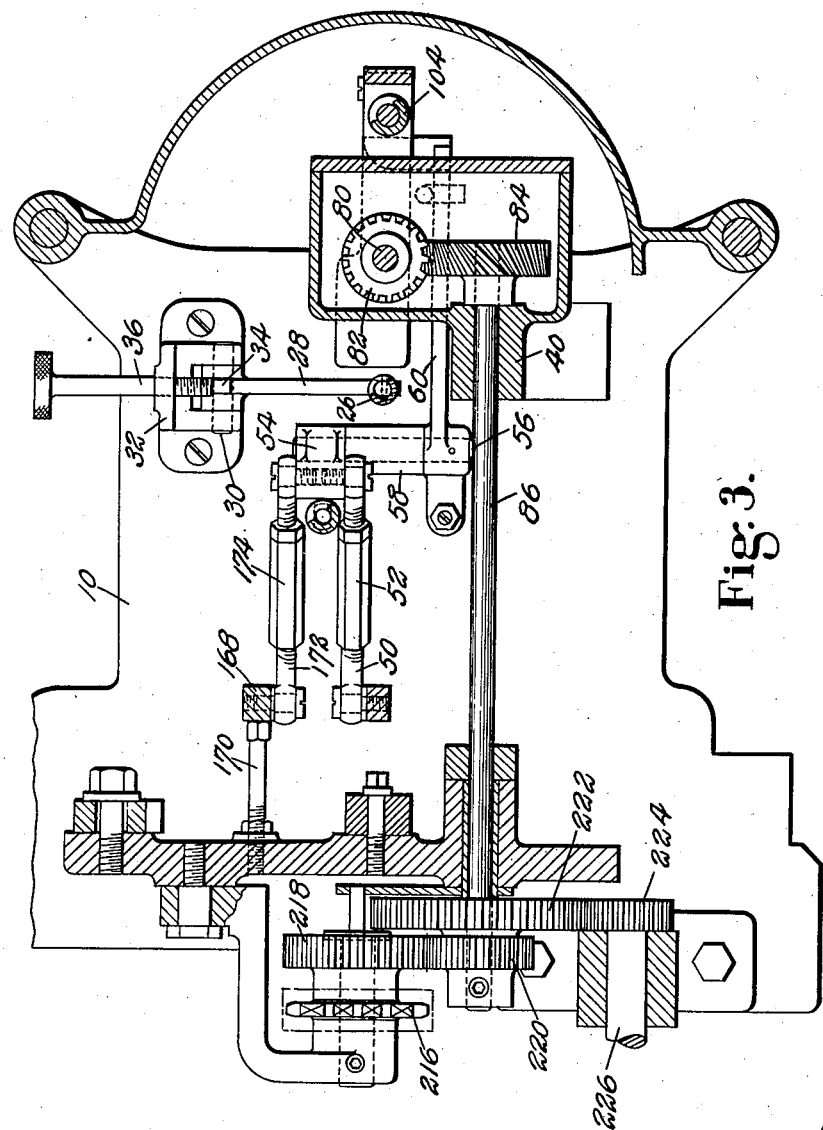
Fig. 3 is a plan view, partly in cross section on the line III—III of Fig. 2.

The roughing tool shaft 18 and the driving shafts 86 and 154 for the rotary disk 64 and the feed disk 130 respectively may be driven in any convenient way, the only essentials being that the tool shaft 18 be driven at high speed and that the shafts 86 and 154 be driven at suitably low speeds to cause the sole to be advanced at the proper rate. As shown, the sprocket 184 is connected by a sprocket chain, indicated by dot-and-dash lines 214, to a sprocket 216 (see Figs. 2 and 3) to which is affixed a gear 218 meshing with a gear 220 secured to the shaft 86. A large gear 222 also secured to the shaft 86 and to the gear 220 is rotated by a pinion 224 upon a shaft 226 driven from a suitable source of power. The shafts 86 and 154 are thus kept in synchronism and are driven at the relatively slow rate required to feed the work properly to the roughing tool.

To the rear end of the shaft 18 is secured a double pulley 228 connected by a belt 230 (Fig. 1) to a large power driven pulley 232. The belt is omitted from Fig. 2 in order to enable the pulleys to be seen more clearly. Either groove of the beveled pulley 228 may be used by reversing the pulley upon the shaft, in order to obtain different shaft speeds, and the pulley 232 is supported by an adjustable arm 234 in order to provide for proper tension of the belt 230 regardless of which end of the pulley 228 is being used.

Having described the invention, what is claimed as new and desired to be secured by Letters Patent of the United States is:

1. In a roughing machine, the combination of a power driven roughing tool, a stationary work support directly adjacent to said tool arranged to support the work against the thrust of the tool, and a yieldable work support adjacent to said stationary work support.

2. In a roughing machine, the combination of a power driven roughing tool, stationary work-supporting means directly adjacent to the tool arranged to support the work against the thrust of the tool, a yieldable work support adjacent to said stationary work-supporting means, and a stationary work support adjacent to said yieldable work support.

3. In a roughing machine, the combination of a power driven yieldably mounted roughing tool, a stationary work support adjacent to the tool, a yieldable work support adjacent to said stationary work support, and treadle-operated means for retracting the tool and the yieldable work support.

4. In a roughing machine, the combination of stationary work-supporting means over which a work piece may be advanced, a power driven roughing tool yieldably mounted directly adjacent to said work-supporting means and arranged to press the work thereon, and power driven feed mechanism yieldably mounted adjacent to said work-supporting means.

5. In a roughing machine, the combination of stationary work-supporting means over which a work piece may be advanced, a power driven roughing tool yieldably mounted adjacent to said work-supporting means, power driven feed mechanism yieldably mounted adjacent to said work-supporting means, and treadle-operated means for retracting the tool and the feed mechanism.

6. In a roughing machine, the combination of a power driven roughing tool, a power driven work-supporting disk adjacent to the tool and adapted to be engaged by one face of a work piece, and a roughened circular stud projecting from the center of the disk and arranged to engage the edge of the work piece and aid in the feeding thereof.

7. In a roughing machine, the combination of a power driven roughing tool, two stationary work supports, a stationary edge gage upon one of said work supports, and a rotatable power driven edge gage adjacent to the other work support.

8. In a roughing machine, a combined work support and feeding device comprising a horizontal, rotatable, power driven disk over which the work may be advanced, and a roughened, circular, vertical stud at the center of said disk adapted to engage the edge of the work and aid in the guiding and feeding thereof.

9. In a roughing machine, the combination of a feed table adapted to support a work piece, an inclined feed disk positioned to engage the upper face of the work piece, and a presser foot positioned in the space between the feed disk and the work piece and arranged to press the work piece upon the feed table.

10. In a roughing machine, the combination of a power driven, rigid, cylindrical, yieldably mounted, roughing tool which is rotatable about a horizontal axis, a power driven work-supporting disk beneath said tool and adapted to be engaged by one face of a work piece, a stud projecting from the center of the disk and arranged to engage the edge of the work piece, and mechanism for feeding the work piece over said work-supporting disk transversely to the axis of the tool.

11. In a sole roughing machine, the combination of a power driven roughing tool, a narrow, vertically stationary sole support beneath the tool, an edge gage beside the tool, a stationary table below the level of said sole support, and an arcuate supporting block so mounted upon the table as to permit said block to be positioned at such a distance from the edge gage that a sole being operated upon will ride upon the block when the roughing tool is operating around the forepart of the sole but will drop off the block when the shank of the sole reaches operating position.

12. In a sole roughing machine, the combination of a power driven roughing tool, a narrow, vertically stationary sole support directly beneath the tool, a pair of sole edge gages, feed mechanism properly related to the edge gages and the tool to feed the marginal portion of a sole automatically and progressively beneath the tool, a table positioned below the level of said sole support, and an adjustable, arcuate, auxiliary supporting block on top of the table and adapted to be set at such a distance from the edge gages that the sole will ride upon it and be supported in a nearly horizontal position when the forepart of the sole is being fed beneath the roughing tool but will drop off the block when the shank portion of the sole reaches the roughing tool.

CHARLES G. BROSTROM.